C. H. SAYRE.
Cultivator-Teeth.
No. 28,780.
Patented June 19, 1860.
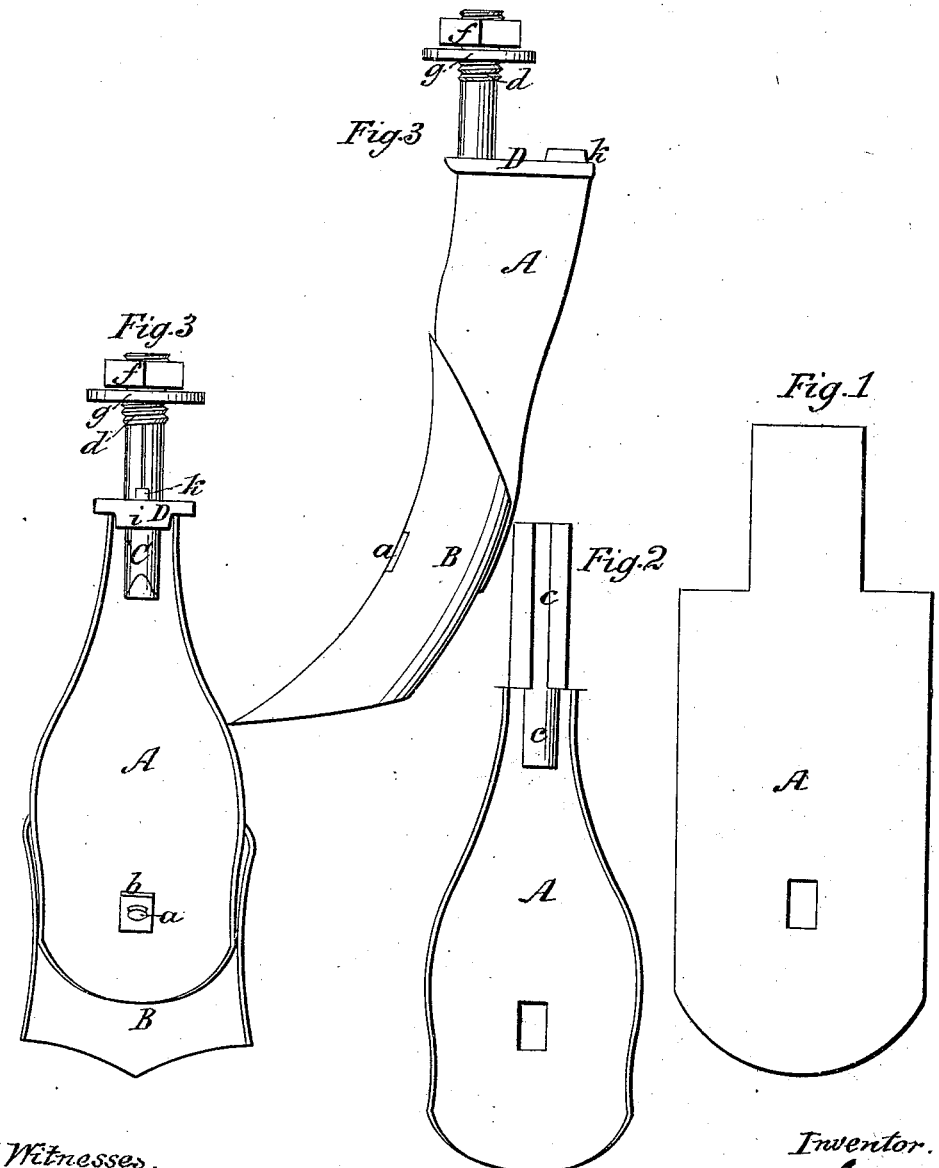

UNITED STATES PATENT OFFICE.

CHAS. H. SAYRE, OF UTICA, NEW YORK.

IMPROVEMENT IN CULTIVATOR-TEETH.

Specification forming part of Letters Patent No. 28,780, dated June 19, 1860.

*To all whom it may concern:*

Be it known that I, CHARLES H. SAYRE, of Utica, in the county of Oneida and State of New York, have invented a certain new and useful Improvement in Cultivator-Teeth, of which the following is a full, clear, and exact description, reference being had to the accompanying drawings, of which—

Figure 1 represents a plan of the blank tooth-shank as cut out previous to being swaged into shape; Fig. 2, a rear elevation of the shank as swaged into form, and showing the piece of rod-iron inserted into the interior of that part of the shank that secures the tooth to the machine ready to be welded together; Fig. 3, a rear, and Fig. 4 a side view, of the tooth completed.

To enable others skilled in the art to make, construct, and use my improvement, I will now describe it in detail, omitting a particular description of such parts as are old and in common use.

The shank A is first cut out of sheet-steel or other suitable metal, somewhat like Fig. 1, and is then welded into form like the lower part of the shank A, Fig. 2, ready to have the reversible point B secured to it by means of a screw-bolt, *a*, and nut *b*. A piece of rod-iron, *c*, of the requisite length and thickness, is then placed in the inside of the upper part of the shank (that part which passes through the frame of the cultivator and by which they are secured together) and raised to a welding-heat, and the two then welded together, the sheet metal inclosing the piece of bar-iron, so as to form a solid shank, after which a screw-thread, *d*, is cut on its upper end, in which a nut, *f*, takes, by means of which, on the shank being passed through the frame of the cultivator, it is rigidly secured to the machine, a washer, *g*, being interposed between the upper side of the rail and the nut. The lower end of the iron bar *c* is projected as far below the lower end of that part of the shank that passes through the frame as will give the necessary rigidity and strength to that part of the shank below to resist the strain upon the tooth and to overcome any obstacle that may suddenly present itself in the path of the machine.

To prevent the upper edge of the shank from cutting the under side of the rail, a loose top plate, D, is passed over the cylindrical part of the shank and covers the upper edges of shank, there being a tongue, *i*, formed on its under side, interposed between the two edges of the shank to prevent their being compressed or forced together, while another is formed on the upper side, K, which takes into a depression formed in the under side of the rail to prevent the tooth from turning or twisting around.

From the foregoing description of my improvement it will be apparent that with simplicity of construction great strength and rigidity in the shank are attained—a point of paramount importance in cultivator-teeth.

Having thus described my invention, what I claim as new, and desire to secure by Letters Patent, is—

The shank A as constructed, in combination with the loose top plate, D, for the purposes set forth.

In testimony whereof I have hereunto set my hand to this specification.

CHAS. H. SAYRE.

Witnesses:
M. M. JONES,
WM. H. CURRY.